J. MIDDLEBY.
BAKER'S OVEN.
APPLICATION FILED NOV. 15, 1906.

No. 914,153.

Patented Mar. 2, 1909.

2 SHEETS—SHEET 2.

Witnesses:
A. L. Folsom.
A. C. Ratigan.

Inventor:
Joseph Middleby
by Wright Brown Quinby May
Attorneys.

UNITED STATES PATENT OFFICE.

JOSEPH MIDDLEBY, OF WATERTOWN, MASSACHUSETTS.

BAKER'S OVEN.

No. 914,153.     Specification of Letters Patent.     Patented March 2, 1909.

Application filed November 15, 1906. Serial No. 343,564.

*To all whom it may concern:*

Be it known that I, JOSEPH MIDDLEBY, of Watertown in the county of Middlesex and State of Massachusetts, have invented certain new and useful Improvements in Bakers' Ovens, of which the following is a specification.

This invention has relation to bakers' ovens, and has for its object to provide certain improvements therein by means of which the oven may be uniformly and continuously heated in all parts thereof to any desired temperature.

Figure 1:
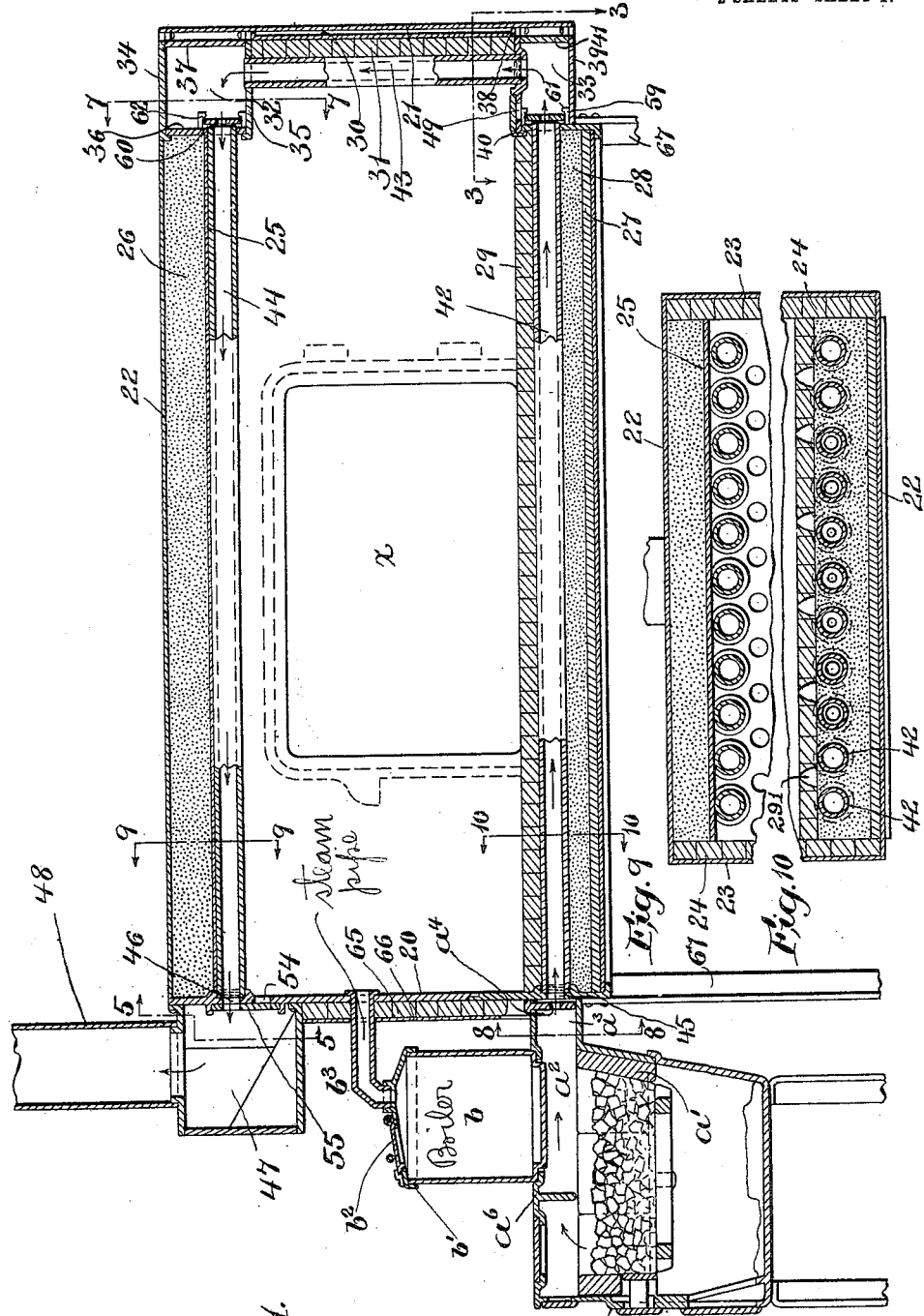
Figure 2:
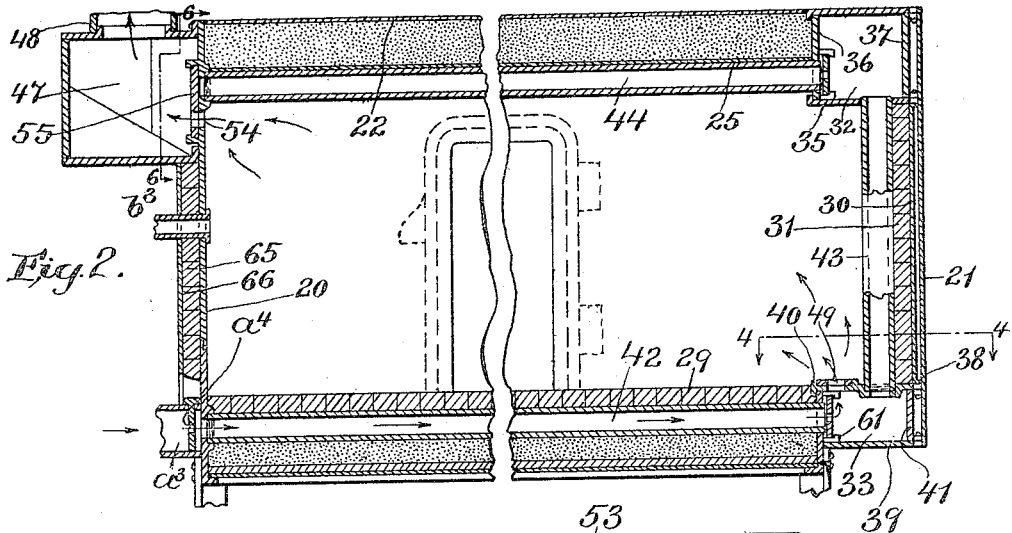
Figure 3:
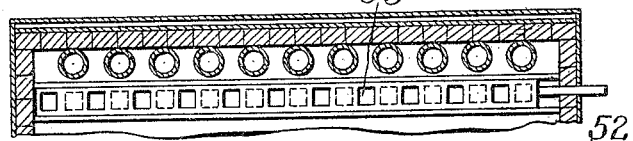
Figure 4:
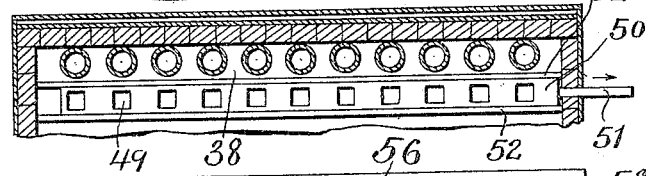
Figure 5:
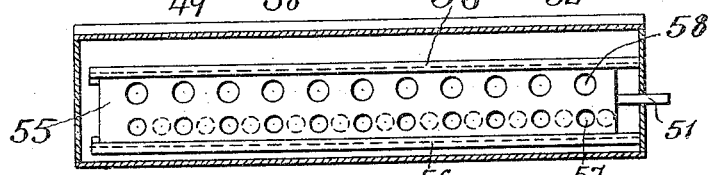
Figure 6:
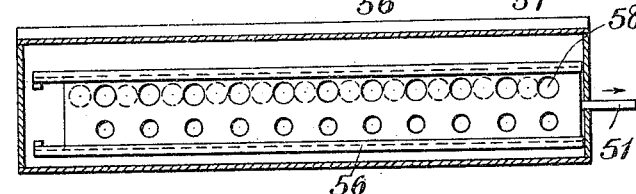
Figure 7:
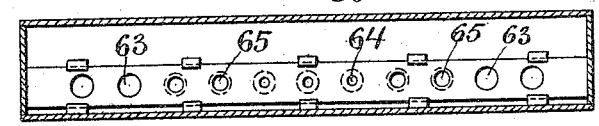
Figure 8:

Referring to the accompanying drawings which illustrate one embodiment of the invention, to which details of construction it is not limited, Figure 1 represents the same in longitudinal section. Fig. 2 represents a similar section with the middle portion broken away, and illustrates the dampers in different positions. Fig. 3 represents a section on the line 3—3 of Fig. 1. Fig. 4 represents a section on the line 4—4 of Fig. 2. Fig. 5 represents a section on the line 5—5 of Fig. 1. Fig. 6 represents a section on the line 6—6 of Fig. 2. Fig. 7 represents a section on the line 7—7 of Fig. 1. Fig. 8 represents a section on the line 8—8 of Fig. 1. Fig. 9 represents a section on the line 9—9 of Fig. 1. Fig. 10 represents a section on the line 10—10 of Fig. 1.

The oven as a whole is preferably oblong and the products of combustion are caused to travel longitudinally of the oven below the oven chamber, upward at the rear end thereof and then forward along the top of the oven chamber, so as to heat the latter uniformly throughout.

20 21 represent the end walls of the oven which consists of metallic plates, and 22 indicates the exterior casing (see Figs. 9 and 10) which forms the top, the sides and the bottom of the oven. This casing may be formed of a shell, as illustrated, or the sides, top and bottom may be formed of separate plates if desired, this being a matter of convenience to be determined by the manufacturer. A door *x* permits access to the oven chamber through one of the side walls.

For convenience in designation, the sides are indicated at 23. Next to the sides are placed walls 24 of fire-brick or other suitable material, which forms the side walls of the oven chamber. The top wall of the chamber is formed of a horizontal plate 25 between which and the upper wall 22 of the casing, is a mass 26 of granular material such as sand, infusorial earth, or other suitable heat absorbing substance as board or sheet magnesia.

Above the bottom plate of the casing 22, there is a second plate 27 covered by a layer of sand 28, or equivalent substance, and above the layer of sand is a floor 29 of firebrick or other analogous refractory material which may have apertures 291 for the emission of heated air. At the inner end of the oven and inside of the end wall 21, there is a second wall 30 faced with a layer of firebrick as at 31, which forms the inner wall of the oven chamber. At the top and bottom at the inner end of the oven there are manifolds 32 33, which consist of substantially oblong chambers. The chamber 32 has the top and bottom walls 34 35, and the side walls 36 37. The chamber or manifold 33, has the top and bottom walls 38 39 and side walls 40 41. The end walls of the manifolds may be formed or constructed in any convenient manner. All of these parts which I have referred to in detail, are suitably connected by rivets, bolts, or other fastenings, to hold them securely in place. These manifolds receive the products of combustion, as will be explained, and conduct them to the next series of tubes. Entirely or partially embedded in the granular material 28 is a series of tubes or conduits 42. The front ends of these tubes are secured in annular flanges in t e front wall 20, and their rear ends extend loosely through apertures in the wall 40 of the manifold 33, to permit expansion and contraction of the tubes. These tubes are practically contiguous to the flooring 29 of fire-brick, so as to heat the same by conduction. The two manifolds 33 32 are connected by a series of vertical tubes or conduits 43, the lower ends of the tubes being seated in annular recesses to the top wall of the manifold 33, and the upper ends of the tubes extending loosely through apertures in the bottom wall 35 of the manifold 32. These tubes 43 are located in the oven chamber and are contiguous or in close proximity to the vertical wall 31 of the fire-brick. There is another series of tubes or conduits 44 which extend from the manifold or chamber 32, forward to the front wall 20 of the oven. These tubes have their rear ends extended loosely into apertures in the wall 36, whereas their front ends are held by a rivet or bolt or other attaching means in annular flanges in the wall 20. The said tubes 44 are in close proximity to the top wall of the oven chamber. By virtue of this construction it will be seen that the heated products of combustion may be passed through ports 45 in the front wall 20 into the tubes 42, whence they pass into the manifold 33, thence upward through the tubes 43 into the manifold 32, and then forward again through the tubes 44, and pass through ports 45 46 in said front wall 20, thus passing completely around the oven chamber. The ports 46 communicate with a smoke box 47 at the front end of the oven, upward from which, extends a stack 48. This smoke box may be formed in any suitable manner, it being illustrated as rectangular.

It is sometimes desired to heat the oven quickly to a high temperature and hence I provide means for permitting the products of combustion, after leaving the tubes 42, to pass directly through the oven chamber itself to the smoke box 47. To accomplish this end, I provide the top wall 38 of the manifold 33 with a plurality of ports 49, as illustrated in Figs. 3 and 4. These ports are shown as square, but they may be of any desired shape. Above these ports I place a sliding damper bar 50, the reduced end 51 of which, projects outward through the side wall of the oven. This bar is adapted to slide between guiding flanges 52 52 extending upwardly from the face of the plate 38. The damper bar itself is provided with a plurality of ports 53 which may be caused to register with the ports 49, as illustrated in Fig. 4, or else to be placed out of registration therewith, as illustrated in Fig. 3, so as to close the said ports 49. When the ports 49 are opened, however, by moving the damper bar 50 to the position shown in Fig. 4, the products of combustion pass directly from the manifold 33 into the oven chamber. To permit their escape from the oven chamber into the smoke box, I provide the front wall 20 of the oven chamber with a plurality of ports 54 which may be closed by a sliding damper 55 arranged in undercut guide flanges 56, formed on the wall 20, as illustrated in Fig. 5 and having an end projecting through the oven wall. This sliding damper controls not only the ports 54 but also the ports 56 with which the tubes 44 communicate. Hence the damper 55 is provided with two sets of ports 57 58. The ports 54 and the ports 46 are so arranged that when the ports 58 register with the ports 46, the ports 54 are closed; but when the damper is shifted to the position shown in Fig. 5, the ports 46 register with the ports 58 and the ports 54 are closed. Under normal conditions, the ports 49 and 54 are closed so that the products of combustion will follow their usual paths through the three sets of tubes and through the manifold. By shifting the dampers 55 and 50 to the positions shown in Figs. 6 and 4 respectively, the products of combustion pass directly from the manifold 33 through the oven chamber and escape into the smoke box 47, thence passing outwardly through the stack 48.

As the products of combustion are apt to pass through the central tubes of the series to the exclusion of the outer tubes, I preferably utilize baffle plates which will serve to spread out the products of combustion and heated gases and cause them to pass substantially equally or in the same volume through all of the same tubes. Of these baffle plates, one is placed at the rear ends of the tubes 42 and the other at the rear ends of the tubes 44. These baffle plates are indicated at 59 and 60 respectively. They are arranged close to the ends of the tubes and are held in place by lugs 61 62 respectively. Each of these baffle plates consists of a thin bar or a plate which is provided with a series of ports for registration with the openings in the tubes. These ports are graduated in diameter, those at the center being the smallest, those at the outer ends of the plate being the largest, and those between being of intermediate size. In Fig. 7 for instance, the larger ports are indicated at 63, the smaller openings or ports at 64 and the intermediate ports at 65.

The fire-box is preferably independent of the oven. It may consist of a stove or range having a relatively large fire pot from which the heated gases or products of combustion may pass directly from the ports 45 which open into the tubes 42.

I have illustrated more or less conventionally, a stove at $a$, which has the fire pot $a'$. Above the fire pot, there is a chamber $a^2$ which extends rearwardly into a flat neck $a^3$, which abuts against wall 20 so as to permit the products of combustion to pass therefrom through the ports 45. At the end of the neck $a^3$, I place a relatively short baffle plate $a^4$ (see Fig. 8), with small ports $a^5$ to reduce the volume of gases which pass into the central tubes 42. This baffle plate is located practically in front of the ports 45 and is removable, being dropped downwardly through a slot in the top wall of the neck $a^3$.

In the baking of bread, it is desirable, for securing certain results, such as keeping the crust soft, that steam or vapor be introduced into the oven chamber. Consequently the top of the stove $a$ is provided with an opening $a^6$ to receive a boiler $b$, the bottom of which will be exposed to the heat of the burning fuel. This boiler or water receptacle may be of any suitable size or shape. It is provided with a cover $b'$ with a lid $b^2$ which may be opened to permit water being introduced into the receptacle. From the cover a pipe $b^3$ leads into the interior of the oven chamber through the front wall 20 so that steam and vapor will pass from the boiler into the oven.

The front wall of the oven will preferably be insulated by a layer 65 of fire-brick covered by a casing 66. The oven itself may rest upon suitable supports 67 and be supported in any suitable manner.

Having thus explained the nature of the invention and described a way of constructing and using the same, although without attempting to set forth all of the forms in which it may be made, or all of the modes of its use, I declare that what I claim is:—

1. A baker's oven, comprising the oven walls, conduits for the products of combustion extending along the top and bottom and upward at the end of the oven chamber, and means by which the products of combustion may be prevented from passing through the top and end conduits and caused to pass directly through said oven chamber.

2. In a baker's oven, the walls of the oven chamber, a manifold at the rear end of the chamber, conduits along the bottom of the chamber to said manifold, a smoke box at the front end of said chamber, conduits leading from said manifold to said smoke box, said manifold having ports to permit the passage of heated gases directly into the oven chamber, a damper for opening or closing said ports, and a damper for closing the conduits leading to said smoke box.

3. A baker's oven comprising an inclosed chamber, communicating conduits for the products of combustion extending along the bottom, end and top of said chamber, an exhaust passage into which the upper conduits open, and means for opening the bottom conduits and exhaust passage directly to the oven chamber and closing their communication with the end and top conduits.

4. A baker's oven comprising an inclosed chamber, communicating conduits for the products of combustion extending along the bottom, end, and top of said chamber, and means for creating a draft through the oven chamber and shutting off the draft through the end and top conduits, whereby the products of combustion may be drawn exclusively through the chamber so as quickly to raise the same to a high temperature.

5. In a baker's oven, the combination with the walls which form the oven chamber, and a heater at the front end of said chamber, of a smoke box at the front end of said chamber, conduits for the products of combustion extending from said heater along the floor of the oven to the rear end thereof, thence upward to the top, and thence forward to the smoke box, there being ports leading from the oven into said smoke box and ports leading from said conduits into the rear portion of the oven chamber, means for opening and closing said ports, and means for closing the conduits leading to said smoke box.

6. In a baker's oven, the combination with the walls which form the oven chamber, and a heater, of manifolds at the top and bottom of the rear end of said chamber, conduits leading to the bottom manifold, conduits connecting said manifolds, conduits leading from the upper manifold, and baffle plates in said manifolds, substantially as and for the purpose set forth.

7. In a baker's oven, the walls which form the oven chamber, a manifold at the rear end of the chamber having ports leading into said chamber, a smoke box at the front end of the chamber having ports communicating with said chamber, a fire pot, conduits leading from the fire pot to said manifold, conduits leading from said manifold to said smoke box, means for opening and closing the ends of the last mentioned conduits, and means for opening and closing said ports, substantially as described.

8. In a baker's oven, a floor therefor comprising a casing, a layer of granular material, heating devices embedded in said layer, and a superimposed layer of refractory material having apertures therethrough, substantially as set forth.

9. In a baker's oven, a bottom therefor, consisting of a casing or box having bottom, side and end walls, a layer of refractory material closing the top of said casing or box and forming the floor of the oven, said layer having apertures therethrough, and heating devices arranged in said casing or box, substantially as set forth.

In testimony whereof I have affixed my signature, in presence of two witnesses.

JOSEPH MIDDLEBY.

Witnesses:
W. S. OLMSTEAD,
CARL P. BOWLES.